United States Patent [19]
McGough

[11] Patent Number: 5,155,765
[45] Date of Patent: Oct. 13, 1992

[54] TELEPHONE PAYSTATION LOWER HOUSING ARMOR

[75] Inventor: Gerald B. McGough, Huntsville, Ala.

[73] Assignee: Quadrum Telecommunications, Inc., Arab, Ala.

[21] Appl. No.: 737,356

[22] Filed: Jul. 29, 1991

[51] Int. Cl.$^5$ .................. H04M 17/00; B65G 11/04
[52] U.S. Cl. ............................ 379/437; 379/145; 194/202
[58] Field of Search ............ 379/155, 143, 145, 437, 379/440, 451; 194/202, 204; 70/417, 418

[56] References Cited
U.S. PATENT DOCUMENTS
3,391,256  7/1968  Nawman .................. 379/143

Primary Examiner—Stafford D. Schreyer
Attorney, Agent, or Firm—Robert J. Black

[57] ABSTRACT

Armor for a telephone paystation lower housing. Four elements welded in place. Three of the four elements are reversible and permit usage on different configurations of paystations.

8 Claims, 1 Drawing Sheet

TELEPHONE PAYSTATION LOWER HOUSING ARMOR

BACKGROUND OF THE INVENTION

1. Field of the Invention

This invention relates to coin telephones, sometimes referred to as telephone paystations, and more particularly to an apparatus to inhibit illegal entrance to the lower housing and vault area of a telephone paystation.

2. Description of the Prior Art

Armored housing, both upper and lower, to protect telephone paystations began to appear a few years ago in certain metropolitan areas where vandalism and burglary were frequently found. Such armored housings typically include the use of welded steel plates added to the outside of conventional housings and bolted on plates to the inside of standard paystation housings. Such arrangements were made to strengthen the unit and generally provide greater security. In many instances, special plates were welded on to protect such areas as the keypad or other areas frequently subject to vandalism. Many telephone companies also developed their own protective facilities for paystation housings. While paystations so equipped are rather imposing in appearance, such arrangements do not actually offer a great deal of protection commensurate with the substantial additional cost involved therein. While in such arrangements there is an extra layer of metal to go through, once this is accomplished there becomes open space to and around the lock assembly which is the preferred access usually utilized by professional burglars. To provide some necessary protection at this point, however, a lock protector was developed and is disclosed in U.S. Pat. No. 4,852,373, assigned to the same assignee as the present application.

Actual protection, however, is a subjective thing, particularly when viewed from the telephone operating company's viewpoint. The lock protector, although effective, offers no outside imposing evidence of its presence. Thus, it is not the total solution for many telephone companies. Accordingly, it is the object of the present invention to provide a new and improved high security shield for the lower housing of the telephone paystation which provides an impressive appearance, therefore suggesting to potential thieves or vandals that the unit is protected from their activities.

However, it should be further noted that a substantial portion of the telephone industry have utilized housings of the single slot type as manufactured by AT&T, GTE, NE, and Qaudrum for many years. It has generally been found that such housings contain adequate security measures, however, in some locations the security of the lower housing which contains the vault and an anti-stuffing device associated with the coin return chutes has become a problem. As is well known, vandalism in the form of stuffing into the anti-stuffing device occurs when paper or other stuffing materials are illegally inserted into the device for the purpose of blocking coin returns to legitimate consumers. The perpetrator of stuffing returns at some later to "unstuff" the mechanism, retrieving the coins that have been maintained within the anti-stuffing device. Another type of vandalism to the anti-stuffing device is by firecrackers of a large size, particularly those known as "M-80s". These are inserted int the device behind the door with the resulting explosion destroying the anti-stuffing device.

Accordingly, it is the object of the present invention to provide a new and improved high security shield for the lower housing of the telephone which provides an impressive appearance and provides protection against the problems outlined above. The appearance providing a suggestion for potential thieves or vandals that the unit is protected from their activities while the design protects from insertion of firecrackers and similar devices.

SUMMARY OF THE INVENTION

The present invention attempts to resolve the above problems by providing a number of stainless steel or similar material thick plates which are applied to the entire front of the lower housing covering the vault door, the anti-stuffing device and the left or right sides of the lower housing. Notches are provided on one side to access the vault lock. There is a small hole on the front center to access the vault door wrench opening. There is also provided an opening for accessing coins from the anti-stuffing device and a necessary emboss or raised portion to provide for clearance of the anti-stuffing device door.

The present invention addresses vault security enhancement and is not involved in protecting the anti-stuffing device. Anti-stuffing device protection is provided in the invention disclosed in my co-pending application Ser. No. 737,355 filed Jul. 29, 1991. The present invention consists basically of four elements or armored plates made of hardened alloy steel which are welded to the lower housing and vault door. The present invention provides all the advantages of the aforementioned wrap around armor and overcomes its disadvantages.

The first element consists of a hardened alloy steel plate applied to the frontal side of the vault door and welded to it. This provides anti-drilling protection without any detrimental effect on prying resistance. Also, the weight of the vault door is not substantially increased. The same part can be used on either of those paystation doors manufactured by GTE or AT&T.

Secondly, there is provided a hardened allow steel plate welded to the front of the lower housing which has an opening for the vault door and is notched for the anti-stuffing device, providing the necessary drilling protection. This part is adaptable so it can be flipped from left to right and used on the GTE or AT&T style housings. Since these parts are relatively flat and have no forming, they can be flattened later after warpage which may occur in the hardening process.

There is also provided a hardened alloy steel plate welded to the vault lock side of the housing. This plate has a small form to go around the corner of the housing. A hole is provided for key access to the vault lock. On the GTE style housing this plate goes on the left side of the housing, while on the AT&T type housing it is flipped top for bottom and goes on the right hand side.

Fourthly, there is a hardened alloy steel plate welded to the anti-stuffing device side of the housing. This plate is identical to the side plate above except that there is no hole for key lock access. Again on GTE style housings this plate goes on the right side of the housing, whereas on the AT&T type housings the item may be flipped top for bottom and go on the right side.

DESCRIPTION OF THE PREFERRED EMBODIMENT

Figure 1:
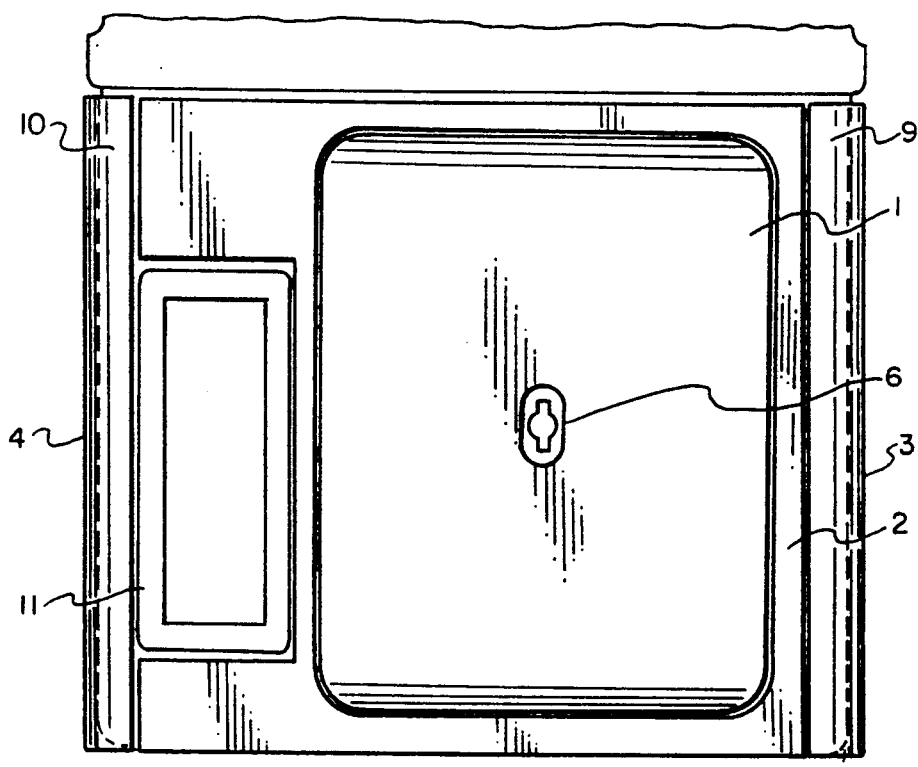
FIG. 1 is a front view of the lower housing armor provided for a telephone paystation in accordance with the present invention.
Figure 2:
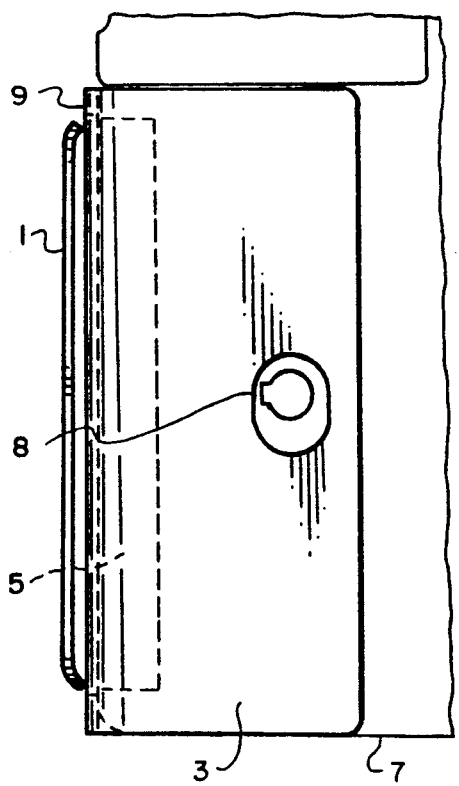
FIG. 2 is a side view of the lower housing armor from a vault lock side of a telephone paystation housing in accordance with the present invention.

Referring first to FIG. 1 of the attached drawings, the lower portion of a telephone paystation of the AT&T type is shown. Welded to the front of the lower housing is the first element of the lower housing armor which consists of a stainless steel or similar hardened alloy steel plate 1 attached to the front of the vault door 5 as seen in FIG. 2. Oblong opening 6 is provided for wrench access to the vault door mechanism. The vault door armor as seen in FIG. 1 is welded around its perimeter attachment to the standard vault door 5.

Referring now to FIG. 1 of the attached drawings, by simple reversal, use on GTE type of telephone paystations, lower vault armor for the front of the vault door 5 is attached in exactly the same manner as indicated above providing the appropriate opening for the wrench access to the vault door mechanism.

Also attached to the front of the housing is lower housing armor element 2 which is welded to the lower housing, which is so positioned to provide clearance for removal of the vault door and also appropriate clearance for the anti-stuffing device portion of the coin return chute 7.

As noted above, for the GTE type paystation plate 2 is reversed to provide proper spacing for the vault door to the left and the coin return chute to the right as found in the GTE type paystations.

Referring now to FIG. 2, the lower armor element for the lock side of the telephone housing shown as applied to the AT&T type telephone paystation with armor 3 being welded to the lock side of the lower housing. Opening 8 provides access to the vault lock. The corner formed portion 9 as seen in FIG. 1 matches the curvature of the housing.

In the case of the GTE type telephone paystations, the lower housing armor side panel element as seen in FIG. 2 is reversed from top to bottom and placed on the opposite side or left side for usage on the GTE type telephone paystations. It likewise is welded to the lower housing in a similar manner. The opening 8 provides access to the key for the vault lock which is located in the case of the GTE manufactured telephone paystations on the left side.

Figure 3:
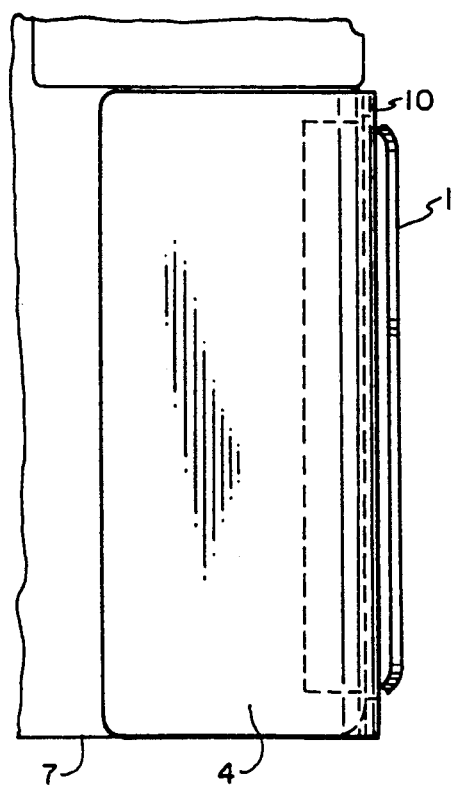
FIG. 3 is a side view of a portion of the lower housing armor from the non-vault lock side of a telephone paystation in accordance with the present invention.

Finally, the lower housing armor element that goes on the same side, or adjacent to the anti-stuffing device or the coin return chute, is shown in FIG. 3. This element, secured to the unit, is welded to the side of the lower housing and as indicated includes no opening within the armor. Form 10 of side armor 4 also matches the curvature of the housing in a manner similar to that of form 9 on the lower housing armor 3 on the lock side.

Again, should application be required of the lower housing armor unit 4 on the GTE type paystation, the unit would be reversed top to bottom and then placed on the right hand side of the lower paystation telephone housing.

From the foregoing it will be obvious that the combination of the four separate units provide adequate protection for the telephone lower housing but are adaptable to both forms of telephone paystations in wide usage throughout the country being designated respectively as the AT&T and GTE type of telephone housings.

While but two alternate embodiments of the present invention have been shown, it will be obvious to those skilled in the art that numerous modifications may be made without departing from the spirit of the present invention which shall be limited only to the scope of the claims appended hereto.

What is claimed is;

1. Armor for a telephone paystation lower housing including a vault door, a wrench access opening in said vault door, a coin return chute anti-stuffing device, a key access to a vault lock included in said telephone paystation lower housing, said armor comprising:
    a first armored element secured to said vault door;
    a second armored element secured to the front of said lower housing;
    a third armored element secured to a first side of said lower housing;
    and a second armored element attached t a side opposite the first side of said telephone paystation lower housing.

2. Telephone paystation lower housing armor as claimed in claim 1 wherein: all of said armored elements are constructed of hardened alloy steel.

3. Telephone paystation lower housing armor as claimed in claim 1 wherein: all of said armored elements are welded to said telephone paystation lower housing.

4. Telephone paystation lower housing armor as claimed in claim 1 wherein:
    said second, third and fourth elements all are reversible to facilitate the usage of said elements on paystations of a first configuration, or in the alternative of a second configuration.

5. Telephone paystation lower housing armor as claimed in claim 1 wherein:
    said first element includes an oblong opening providing wrench access to said vault door.

6. Telephone paystation lower housing armor as claimed in claim 1 wherein:
    said third armored element includes an opening providing access to a vault lock.

7. Telephone paystation lower housing armor as claimed in claim 1 wherein:
    said third and fourth armored elements both include a curved edge adapted to match the confirmation of said telephone paystation lower housing.

8. Telephone paystation lower housing armor as claimed in claim 1 wherein:
    all of said armored elements are paint finished to match standard paystation telephone lower housing finishes.

* * * * *